(12) United States Patent
Tai et al.

(10) Patent No.: US 9,098,705 B2
(45) Date of Patent: *Aug. 4, 2015

(54) METHOD, APPARATUS, AND SYSTEM FOR ISOLATING A TEMPORARY PARTITION ON A HOST (71) Applicant: Intel Corporation, Santa Clara, CA (US)

(72) Inventors: Tsung-Yuan Charles Tai, Portland, OR (US); Kapil Sood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/770,167

(22) Filed: Feb. 19, 2013

(65) Prior Publication Data
US 2014/0337913 A1 Nov. 13, 2014

Related U.S. Application Data (63) Continuation of application No. 11/518,005, filed on Sep. 7, 2006, now Pat. No. 8,453,197.

(51) Int. Cl.
G06F 17/00 (2006.01)
G06F 21/57 (2013.01)
G06F 9/445 (2006.01)
G06F 9/50 (2006.01)
G06F 21/53 (2013.01)
G06F 9/455 (2006.01)

(52) U.S. Cl.
CPC *G06F 21/57* (2013.01); *G06F 8/61* (2013.01); *G06F 9/45545* (2013.01); *G06F 9/45558* (2013.01); *G06F 9/5077* (2013.01); *G06F 21/53* (2013.01); *G06F 2009/45587* (2013.01)

(58) Field of Classification Search
USPC .......................................................... 726/1
See application file for complete search history.

(56) References Cited

U.S. PATENT DOCUMENTS

| 7,146,640 | B2 * | 12/2006 | Goodman et al. .............. 726/16 |
| 7,373,476 | B2 * | 5/2008 | Asano et al. .................. 711/173 |
| 7,484,237 | B2 * | 1/2009 | Joly et al. ........................ 726/1 |
| 7,536,598 | B2 | 5/2009 | Largman et al. |
| 7,725,559 | B2 | 5/2010 | Landis et al. |

(Continued)

FOREIGN PATENT DOCUMENTS

EP 1898307 A1 3/2008

OTHER PUBLICATIONS

Official Communication received for European Application No. 07253459.7, mailed on Jun. 19, 2009, 4 pages.

(Continued)

Primary Examiner — Amare F Tabor
(74) Attorney, Agent, or Firm — Barnes & Thornburg LLP (57) ABSTRACT A method, apparatus and system enable a temporary partition on a host to be isolated. More specifically, a temporary partition may be initialized in a partitioned host, assigned its own security policy and given the necessary resources to complete a task. Thereafter, the temporary partition may be dismantled. Since the temporary partition is isolated from the remaining partitions on the host, the temporary partition may be allowed to run a "weaker" security policy than the rest of the partitions because the isolation of the temporary partition ensures that the security of the remaining partitions may remain uncompromised.

20 Claims, 5 Drawing Sheets

(56) References Cited

U.S. PATENT DOCUMENTS

| | | |
|---|---|---|
| 7,984,108 B2 | 7/2011 | Landis et al. |
| 8,453,197 B2 | 5/2013 | Tai et al. |
| 2004/0111578 A1 | 6/2004 | Goodman et al. |
| 2005/0223220 A1 | 10/2005 | Campbell et al. |
| 2006/0136910 A1 | 6/2006 | Brickell et al. |
| 2006/0136911 A1 | 6/2006 | Robinson et al. |
| 2008/0066143 A1 | 3/2008 | Tai et al. |

OTHER PUBLICATIONS

Extended European Search Report received for European Patent Application No. 07235459.7, mailed Feb. 4, 2008, 8 pages.

\* cited by examiner

METHOD, APPARATUS, AND SYSTEM FOR ISOLATING A TEMPORARY PARTITION ON A HOST

CROSS-REFERENCE TO RELATED U.S. PATENT APPLICATIONS

This application is a continuation application of U.S. application Ser. No. 11/518,005, entitled "METHOD, APPARATUS AND SYSTEM FOR ISOLATING A TEMPORARY PARTITION ON A HOST," which was filed on Sept. 7, 2006.

BACKGROUND

Existing corporate policy typically dictates that partitioned platforms be pre-configured with static partitions having standard configurations and deployment. Thus, for example, a virtualized host in a corporate environment is typically deployed with a predetermined number of virtual machines to be spawned, with resources for each virtual machine defined statically. As a result, if a user desires to create a temporary "working" partition (e.g., a temporary partition), the user may run into difficulties because corporate policy typically blocks such activity for security purposes.

Figure 1:
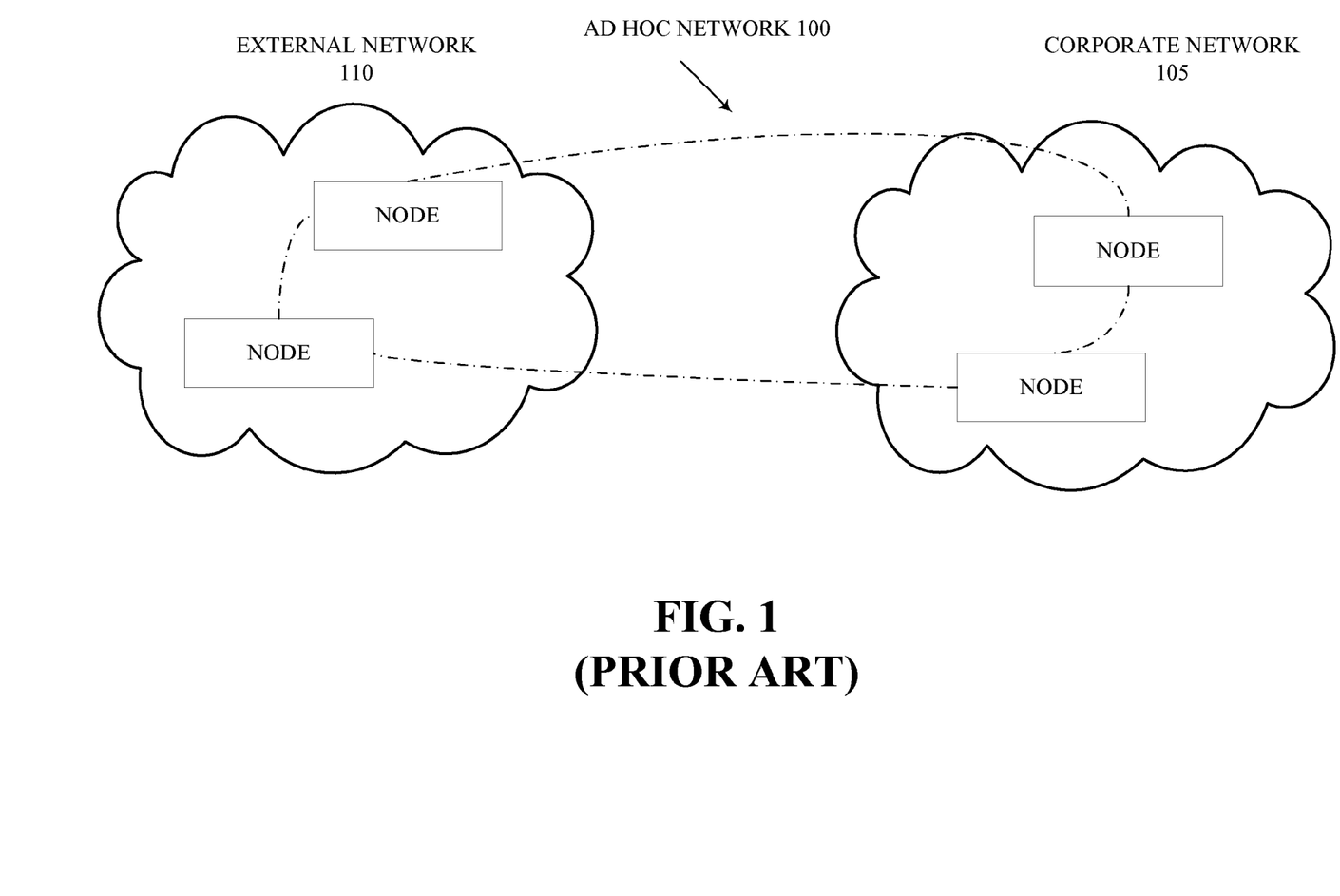
FIG. 1 illustrates conceptually a mesh network.

Collectively on a network, these temporary working partitions may be referred to as "mesh networks", i.e., self configuring interconnections of partitions on multiple nodes (e.g., laptop and/or handheld devices) that allow users to come together on an ad-hoc basis, with no or only a minimal level of security, and initiate inter-user and external communication sessions (illustrated conceptually in FIG. 1). Mesh networks are used to enable ad-hoc routing of network traffic and user data between nodes. As a result, users on mesh networks may use each others' nodes (e.g., laptops) to share internet and other network resources (e.g., printer resources), and once they accomplish a task, the mesh network may be dismantled. As described above, however, in corporate environments, mesh networks may be unauthorized due to security concerns. In other words, the predefined security policy on the platform may prevent the platform from participating in a mesh network.

BRIEF DESCRIPTION OF THE DRAWINGS

The present invention is illustrated by way of example and not limitation in the figures of the accompanying drawings in which like references indicate similar elements, and in which.

DETAILED DESCRIPTION OF THE DRAWINGS

Embodiments of the present invention provide a method, apparatus and system for isolating a temporary partition on a host. More specifically, on partitioned platforms, embodiments of the present invention enable dynamic spawning of one or more temporary partitions having their own security policy, isolated from the rest of the platform. These temporary partitions may participate in unsecured and/or minimal security mesh networks without endangering the remaining partitions on the host. Reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

According to an embodiment of the invention, on a partitioned platform, users may maintain separate partitions for their applications, each running at different privilege levels and with different security settings. In other words, the platform may include a dedicated administrative partition, one or more user partitions and/or include the ability to spawn temporary partitions that may participate in mesh networks without jeopardizing the entire platform. The administrative partition may also support multiple other partitions, including an embedded IT partition. The security architecture of the platform and segregation of the partitions on this platform allows a single platform to enforce multiple security policies in different partitions, at the same time. In other words, since the partitioned platform maintains strict boundaries between partitions, a temporary partition may include a lower security setting than other partitions on the platform and participate in a non-secure network without affecting the security of the other partitions on the platform.

Embodiments of the invention support a variety of partition types. The common thread amongst these partition types includes the ability to maintain a strict separation between partitions, either physically or virtually. Thus, for example, in one embodiment, the partitions may be implemented by embedded processors, e.g., Intel® Corporation's Active Management Technologies ("AMT"), "Manageability Engine" ("ME"), Platform Resource Layer ("PRL") and/or other comparable or similar technologies. In an alternate embodiment, the partitions may be virtualized, e.g., virtual machines (VM) in Intel® Corporation's Virtualization Technology ("VT") scheme, running on a Virtual Machine Monitor (VMM) on the platform. In yet another embodiment, on a multi-core platform, a partition may comprise one of the many cores that exist on the platform. In multi-core architectures, each core may have its independent address boundary and execution, and partition isolation may be provided by the platform hardware. It will be apparent to those of ordinary skill in the art that a virtualized host may also be used to interact with and/or leverage services provided by AMT, ME and PRL technologies.

Figure 2:
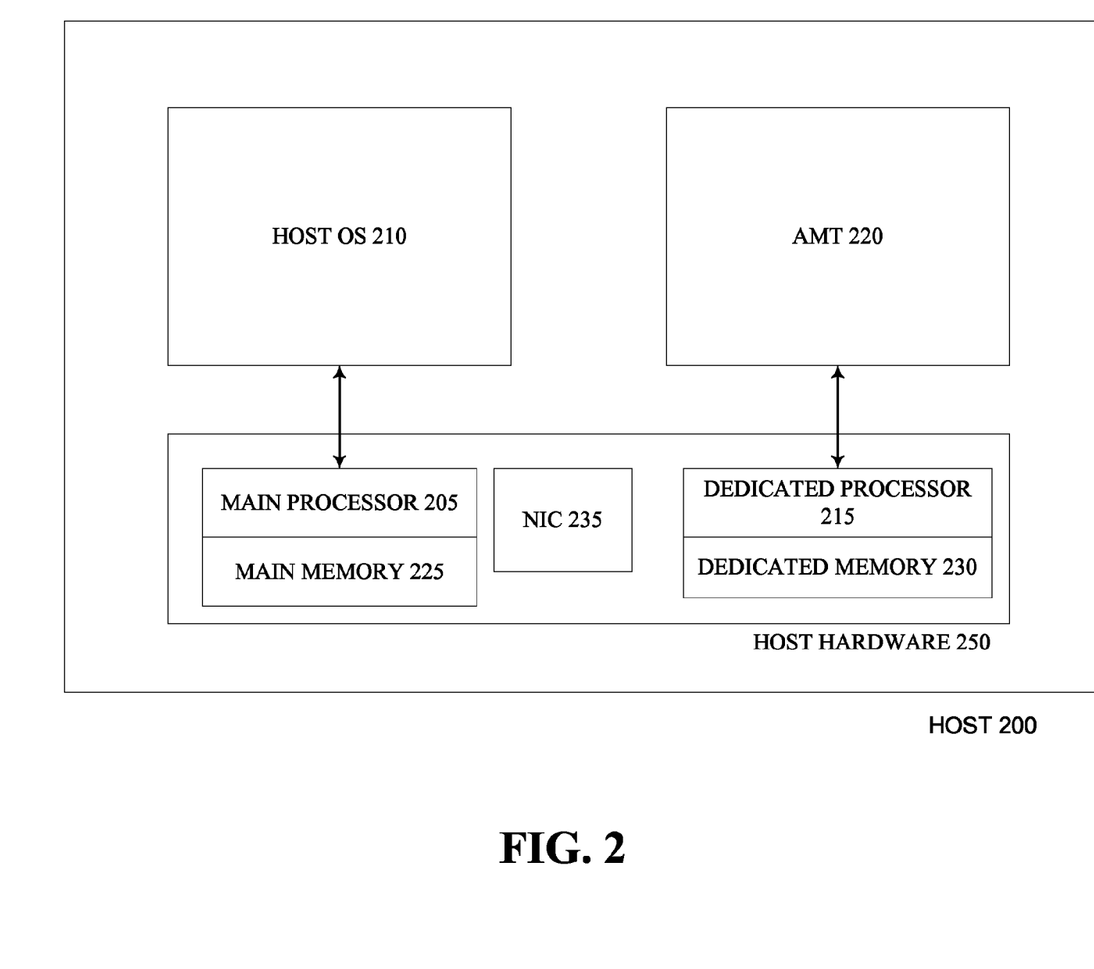
FIG. 2 illustrates an example AMT environment.

By way of example, FIG. 2 illustrates conceptually a typical Intel® AMT environment as implemented by Intel® Corporation. It will be readily apparent to those of ordinary skill in the art that embodiments of the present invention may also be implemented in other similar and/or comparable implementations of AMT. Only the components pertinent to describing the AMT environment have been illustrated in order not to unnecessarily obscure embodiments of the present invention, but it will be readily apparent to those of ordinary skill in the art that additional components may be included without departing from the spirit of embodiments of the invention.

Thus, as illustrated in FIG. 2, a device ("Host 200") may include a host operating system ("Host OS 210") and system hardware ("Hardware 250"). According to one embodiment, Hardware 250 may include one, two or more processors, one or more to perform typical processing tasks for Host OS 210 ("Main Processor 205") while the other may be dedicated exclusively to managing the device via a dedicated partition ("Dedicated Processor 215" for "AMT 220"). Each processor may have associated resources on Host 200 and they may share one or more other resources. Thus, as illustrated in this example, Main Processor 205 and Dedicated Processor 215 may each have portions of memory dedicated to them ("Main Memory 225" and "Dedicated Memory 230" respectively) but they may share a network interface card ("NIC 235").

Figure 3:
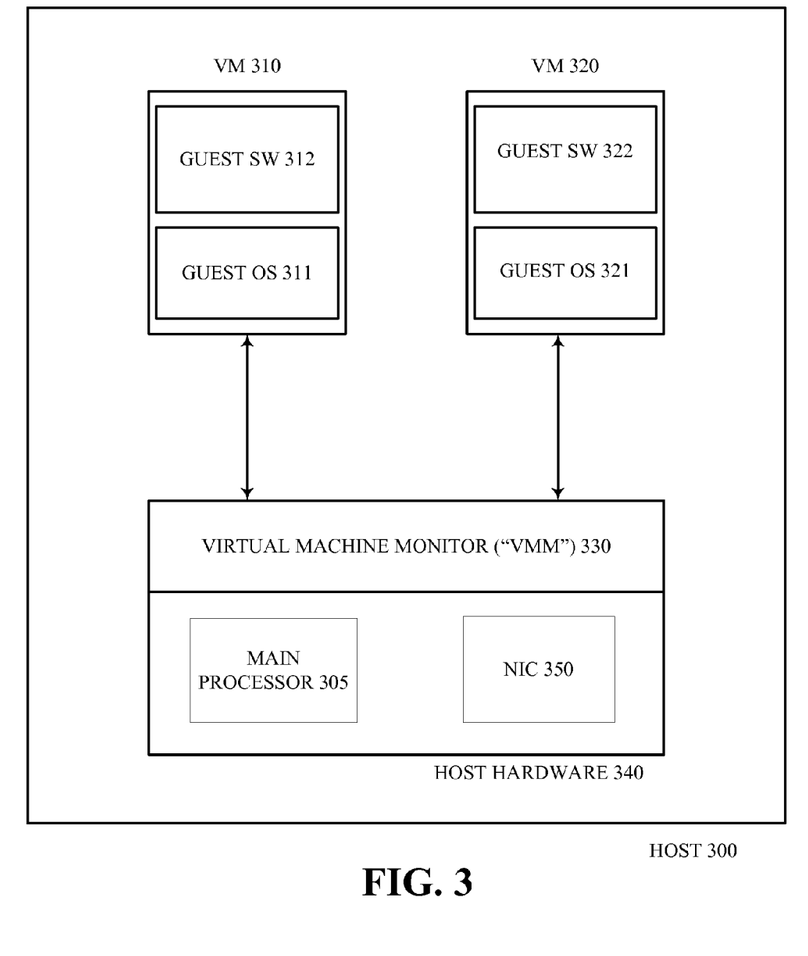
FIG. 3 illustrates an example virtual machine host.

Similarly, as illustrated in FIG. 3, if device ("Host 300") is virtualized, it may include only a single processor but a virtual machine monitor ("VMM 330") on the device may present multiple abstractions and/or views of the device or host, such that the underlying hardware of the host appears as one or more independently operating virtual machines ("VMs"). VMM 330 may be implemented in software (e.g., as a standalone program and/or a component of a host operating system), hardware, firmware and/or any combination thereof. VMM 330 manages allocation of resources on the host and performs context switching as necessary to cycle between various VMs according to a round-robin or other predetermined scheme. It will be readily apparent to those of ordinary skill in the art that although only one processor is illustrated ("Main Processor 305"), embodiments of the present invention are not so limited and multiple processors or processor cores may also be utilized within a virtualized environment.

Although only two VM partitions are illustrated ("VM 310" and "VM 320", hereafter referred to collectively as "VMs"), these VMs are merely illustrative and additional virtual machines may be added to the host. VM 310 and VM 320 may function as self-contained platforms respectively, running their own "guest operating systems" (i.e., operating systems hosted by VMM 330, illustrated as "Guest OS 311" and "Guest OS 321" and hereafter referred to collectively as "Guest OS") and other software (illustrated as "Guest Software 312" and "Guest Software 322" and hereafter referred to collectively as "Guest Software").

Each Guest OS and/or Guest Software operates as if it were running on a dedicated computer rather than a virtual machine. That is, each Guest OS and/or Guest Software may expect to control various events and have access to hardware resources on Host 300. Within each VM, the Guest OS and/or Guest Software may behave as if they were, in effect, running on Host 300's physical hardware ("Host Hardware 340", which may include a Network Interface Card ("NIC 350")).

It will be readily apparent to those of ordinary skill in the art that an AMT, ME or PRL scheme may also be implemented within a virtualized environment. For example, VM 320 may be dedicated as an AMT partition on a host while VM 310 runs user applications on the host. In this scenario, the host may or may not include multiple processors. If the host does include two processors, for example, VM 320 may be assigned Dedicated Processor 215 while VM 310 (and other VMs on the host) may share the resources of Main Processor 205. On the other hand, if the host includes only a single processor, the processor may serve both the VMs, but VM 320 may still be isolated from the other VMs on the host with the cooperation of VMM 330. For the purposes of simplicity, embodiments of the invention are described in a virtualized environment, but embodiments of the invention are not so limited. Instead, any reference to a "partition", a secure partition", a "security partition" and/or an "administrative partition" shall include any physical and/or virtual partition (as described above).

Embodiments of the present invention enable partitioned platforms to maintain security and enforce different security policies in different partitions. As previously discussed, embodiments of the present invention may take advantage of the ability of partitioned platforms to maintain secure boundaries between different partitions. Thus, embodiments of the present invention enable dynamic spawning of temporary partitions which may each be capable of enforcing a different security policy than other partitions on the platform. These temporary partitions may, in one embodiment, participate in ad-hoc mesh networks without compromising the security of the platform. In one embodiment, for non-networking applications, users may create these specialized partitions for executing applications with lower security policies.

Figure 4:
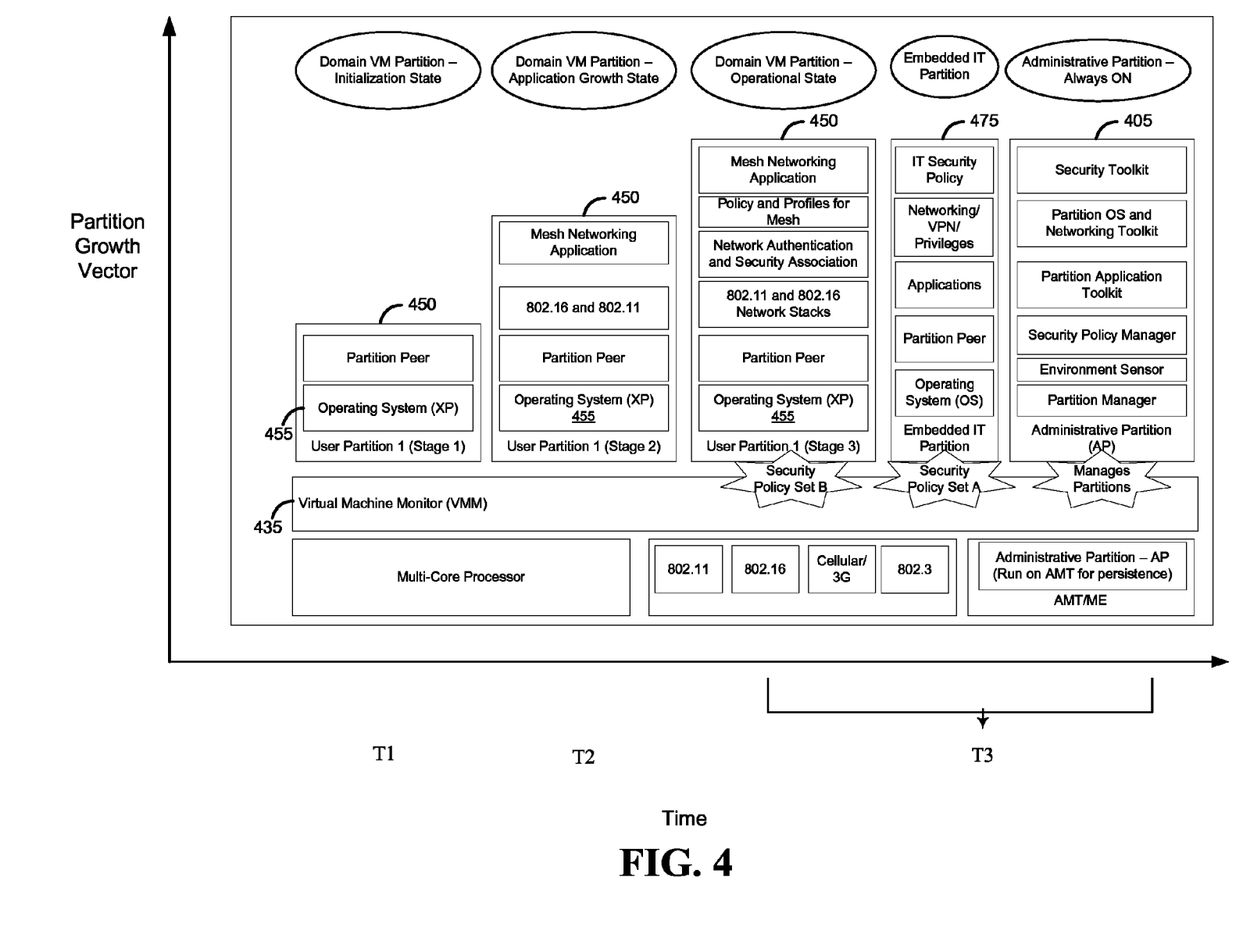
FIG. 4 illustrates conceptually an embodiment of the present invention.

FIG. 4 illustrates an embodiment of the present invention. The illustration and accompanying text assume a virtualized platform, but as previously discussed, embodiments of the invention are not so limited. Instead, embodiments of the invention may be implemented on a variety of partition types, e.g., AMT, ME and/or PRL, as described above. As illustrated, the X-axis in FIG. 4 represents a timeline while the Y-axis represents the growth of the partition(s) on Host 400. Thus, at time T1, a user may decide to request creation of a temporary partition by interacting with a persistent Administrative Partition 405 on Host 400. Administrative Partition 405 may initialize a temporary partition (Domain VM 450, which may acquire a distinct operating stack ("OS 455") and a specific application purpose (i.e., the application for which Domain VM 450 was created), having no overlap with Administrative (and/or Embedded IT) Partition 405 on Host 400.

At time T2, Domain VM 450 may detect IEEE 802.11 and/or IEEE 802.16 interfaces on Host 400, and/or these interfaces may be specified by the application running in Domain VM 450. As a result, Domain VM 450 may create new virtual interfaces for each of these networks for its own use. In one embodiment, OS 455 executing on Domain VM 450 may utilize these virtual network interfaces (virtual NICs) as its own interfaces. Facilitated by a combination of VMM 435 and Administrative Partition 405, OS 455 may not be aware that it is sharing these NICs with other partitions. During time T2, Domain VM 450 may enter a "growth" stage and start building upon application specific details, including the following:

(i) The user may configure the Domain VM 450 with specific mesh connection parameters including the role of this mesh node, the access control and privilege levels on this VM, and the various networking parameters;

(ii) The user may configure the credentials that the user expects Domain VM 450 to use in creating the mesh community with other platforms. According to one embodiment, the user may use "weak" security credentials (e.g., shared passwords), even though the Embedded IT partition on Host 400 may have a security policy against using "weak" credentials. Since Domain VM 450 is a separate/distinct domain on Host 400, its use of "weak" credentials does not compromise the security of the entire platform.

(iii) The user may configure other policies and profiles for the mesh nodes, including adding each mesh nodes' temporary VM as communicating mesh nodes, routing and forwarding policies, firewall and security configuration for screening for data traffic, and other specific roles that each VM may be designed to execute.

(iv) Domain VM 450 may execute the necessary mesh networking protocols (e.g., IEEE 802.11s), and establish the links with other mesh nodes.

(v) Domain VM 450 may perform security operations such as performing inter-mesh node authentication protocols (e.g., IETF EAP, IEEE 802.11i), deriving a secret master key, deriving encryption keys for protecting the data, management, and network routing frames, and activating the security keys for encrypting and message integrity of all link level frames.

In one embodiment, upon completion of building application specific details, at time T3, Domain VM 450 is in an operational state and the user may perform the activities on the newly created Domain VM 450 partition. Specifically, Domain VM 450 may share all platform resources (e.g., hard drive, monitor, network interfaces, etc.) which have been assigned on Host 400 to Domain VM 450. As illustrated, at time T3, both an Embedded IT Partition 475 and Administrative Partition 405 are also active. Administrative Partition 405 may manage the other partitions and enable Embedded IT Partition 475 to run a first security policy (Security Policy A) while Domain VM 450 runs a second security policy (Security Policy B). Thus, although Domain VM 450's Security Policy B may be "weak", the entire platform is not compromised because Domain VM 450's partition runs in its segregated and secured partition, separated from Embedded IT Partition 475 (and/or any other home/personal partitions). Finally, at time T4, once the user has accomplished its task on Domain VM 450, Domain VM 450 partition may go into a "defunct" state where all platform resources are released back to the persistent Administrative Partition 405 on Host 400, and all networking and application context may be removed. In one embodiment, if Embedded IT Partition 475 desires a log of all platform activities, then Administrative Partition 405 may be configured to do so.

Figure 5:
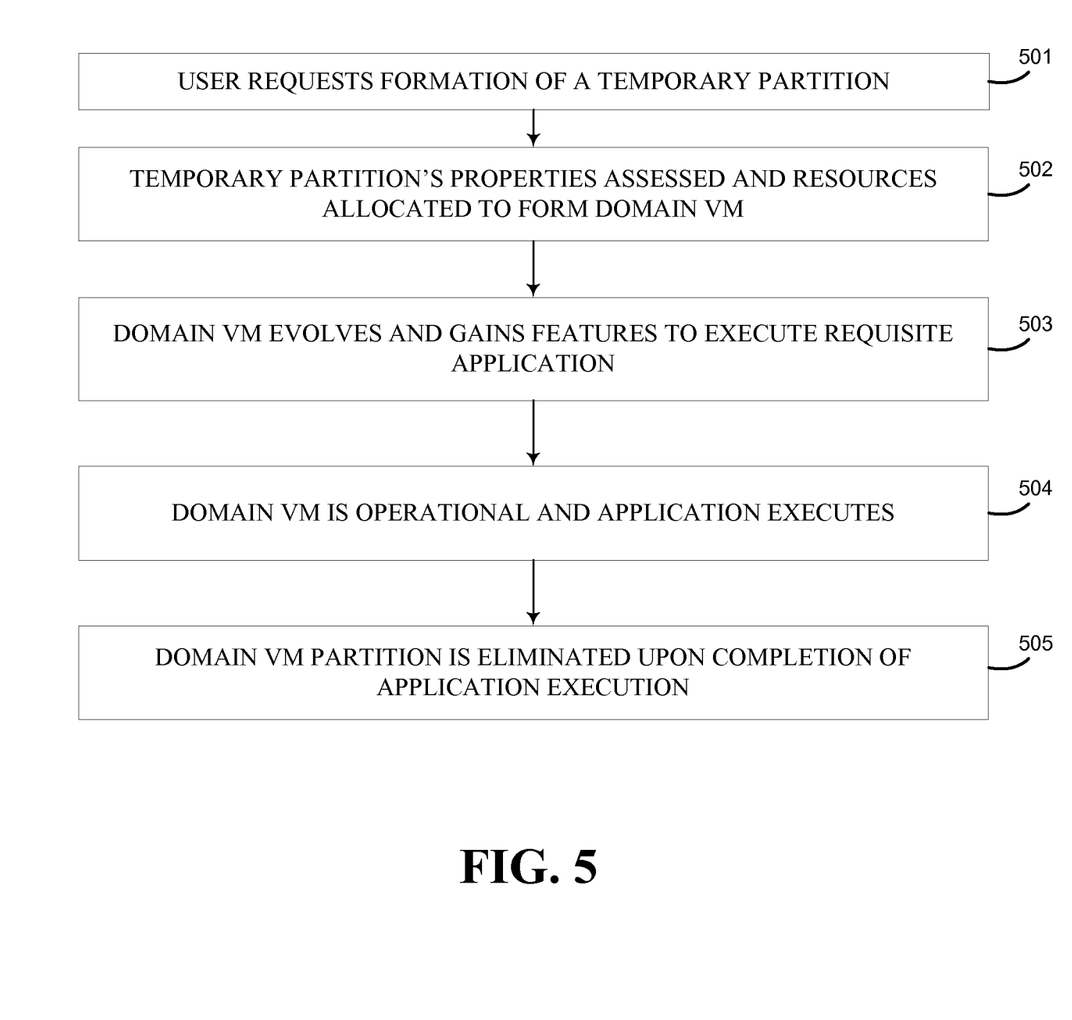
FIG. 5 is a flow chart illustrating in further detail the evolution of a temporary partition according to an embodiment of the present invention.

FIG. 5 is a flow chart illustrating in further detail the evolution of a temporary partition according to an embodiment of the present invention. As illustrated, at 501, during a "conception" phase, a user may request formation of a temporary partition (e.g., by attempting to join a mesh network). Thereafter, in 502, during an "initialization" phase, the partition's properties may be assessed and appropriate resources may be allocated (e.g., processor time, network interface, OS, application stack, network stack and security access control) to form Domain VM 450. In 503, Doman VM 450 may evolve during a "growth" phase and the partition may gain features to execute an application (e.g., security authentication and state, application policy and profiles, network connectivity and state, initiate appropriate execution environment to support application). Thereafter, Domain VM 450 is "operational" in 504, and the application may be executed. The partition may maintain the application state, error handling, network environment sensing, user interaction and security state during the operational state. In 505, the partition may be eliminated and deemed "defunct" when one of the following occurs: (i) the application concludes; (ii) the application experiences an unrecoverable error; (iii) the partition manager on Administrative Partition 405 dictates that the partition should be shut down; (iv) a security compromise is detected on this partition; (v) Access Control on the host is violated; and (vi) network conditions cause the partition to shut down. It will be readily apparent to those of ordinary skill in the art that the above list is merely illustrative, not exhaustive, and the partition may be configured to shut down for a variety of other reasons and/or by other inputs.

The hosts according to embodiments of the present invention may be implemented on a variety of computing devices. According to an embodiment, a computing device may include various other well-known components such as one or more processors. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device for providing input data. It will be readily apparent to those of ordinary skill in the art that in a virtualized environment, these input devices may be virtualized such that each VM may have a separate application desktop icon. In other words, each icon may have a separate virtualized input device while the user remains oblivious to the underlying VMs. In alternate embodiments, the host bus controller may be compatible with various other interconnect standards including PCI, PCI Express, FireWire and other such existing and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method comprising:
receiving a request to initialize an application-specific temporary partition for an application on a partitioned host;
dynamically initializing and configuring the application-specific temporary partition with an application-specific security policy in response to receiving the request to initialize the application-specific temporary partition;
allocating basic system resources and application specific resources to the temporary partition;
maintaining a security boundary between an administrative partition of the partitioned host and the temporary partition;
eliminating the temporary partition after the application has completed execution; and
releasing the basic system resources and the application specific resources in response to eliminating the temporary partition.

2. The method of claim 1, wherein application-specific security policy enables the temporary partition to participate as a node in a mesh network having minimal security.

3. The method of claim 2, wherein the mesh network comprises a plurality of interconnected, self-configuring nodes, each node of the mesh network being configurable to relay communications between other nodes to facilitate node-to-node communications within the mesh network.

4. The method of claim 1, further comprising:
intercepting, by the administrative partition, the request to initialize an application-specific temporary partition;
wherein initializing the application-specific temporary partition comprises initializing the application-specific temporary partition by the administrative partition.

5. The method of claim 1, wherein the application specific resources comprise network resources to enable the temporary partition to participate in a mesh network comprising a plurality of temporary partitions residing on a plurality of hosts.

6. The method of claim 1, wherein the application-specific security policy for the temporary partition is weaker than the security policy for other partitions on the partitioned host.

7. The method of claim 1, wherein the partitioned host comprises a virtualized platform, an embedded platform, or a multi-core platform.

8. A partitioned host, the partitioned host comprising:
a partition manager;
an administrative partition coupled to the partition manager; and
an application-specific temporary partition dynamically spawned by the administrative partition, the temporary partition having an application-specific security policy configured during dynamic spawning;
wherein the partition manager is to maintain a security boundary between the administrative partition and the temporary partition; and
wherein the administrative partition is to (i) allocate basic system resources and application specific resources to the temporary partition, (ii) eliminate the temporary partition after the application has completed execution, and (iii) release the basic system resources and the application specific resources in response to eliminating the temporary partition.

9. The partitioned host of claim 8, wherein:
the partition manager comprises a virtual machine monitor;
the administrative partition comprises a virtual machine coupled to the virtual machine monitor; and
the temporary partition comprises a virtual machine coupled to the virtual machine monitor.

10. One or more non-transitory computer-readable storage media comprising a plurality of instructions that in response to being executed cause a partitioned host to:
receive a request to initialize an application-specific temporary partition for an application on the partitioned host;
dynamically initialize and configure the application-specific temporary partition with an application-specific security policy in response to receiving the request to initialize the application-specific temporary partition;
allocate basic system resources and application specific resources to the temporary partition;
maintain a security boundary between an administrative partition of the partitioned host and the temporary partition;
eliminate the temporary partition after the application has completed execution; and
release the basic system resources and the application specific resources in response to eliminating the temporary partition.

11. The one or more computer-readable storage media of claim 10, wherein application-specific security policy enables the temporary partition to participate as a node in a mesh network having minimal security, wherein the mesh network comprises a plurality of interconnected, self-configuring nodes, each node of the mesh network being configurable to relay communications between other nodes to facilitate node-to-node communications within the mesh network.

12. The one or more computer-readable storage media of claim 10, further comprising a plurality of instructions that in response to being executed cause the partitioned host to:
intercept, by the administrative partition, the request to initialize an application-specific temporary partition;
wherein to initialize the application-specific temporary partition comprises to initialize the application-specific temporary partition by the administrative partition.

13. The one or more computer-readable storage media of claim 10, wherein the application specific resources comprise network resources to enable the temporary partition to participate in a mesh network comprising a plurality of temporary partitions residing on a plurality of hosts.

14. The one or more computer-readable storage media of claim 10, wherein the application-specific security policy for the temporary partition is weaker than the security policy for other partitions on the partitioned host.

15. The one or more computer-readable storage media of claim 10, wherein the partitioned host comprises a virtualized platform, an embedded platform, or a multi-core platform.

16. A method comprising:
initializing an administrative partition having a first security policy on a partitioned host;
receiving a request to initialize an application-specific temporary partition capable of participating as a node in a non-secure mesh network;
examining the first security policy and determining that the first security policy prohibits participation in the non-secure mesh network;
dynamically initializing and configuring the application-specific temporary partition with a second, application-specific security policy that enables participation in the non-secure mesh network in response to determining that the first security policy prohibits participation in the non-secure mesh network;
allocating basic system resources and application specific resources to the temporary partition;
maintaining a security boundary between an administrative partition of the partitioned host and the temporary partition;
eliminating the temporary partition after the application has completed execution; and
releasing the basic system resources and the application specific resources in response to eliminating the temporary partition.

17. The method of claim 16, wherein the non-secure mesh network comprises a plurality of interconnected, self-configuring nodes, each node of the mesh network being configurable to relay communications between other nodes to facilitate node-to-node communications within the mesh network.

18. The method of claim 16, further comprising:
intercepting, by the administrative partition, the request to initialize the application-specific temporary partition;
wherein examining the first security policy comprises examining the first security policy by the administrative partition; and
wherein dynamically initializing and configuring the application-specific temporary partition with the second, application-specific security policy comprises dynamically initializing and configuring the application-specific temporary partition with the second, application-specific security policy by the administrative partition.

19. The method of claim 16, wherein the second, application-specific security policy is weaker than the first security policy.

20. The method of claim 16, wherein the partitioned host comprises a virtualized platform, an embedded platform, or a multi-core platform.

* * * * *